United States Patent [19]  [11] 4,049,781
Acker et al.  [45] Sept. 20, 1977

[54] METHOD OF PREPARING LOOSELY AGGREGATED 200-500 MILLIMICRON SILICA

[75] Inventors: Ellsworth George Acker, Baltimore; Milton Edward Winyall, Columbia, both of Md.

[73] Assignee: W. R. Grace & Co., New York, N.Y.

[21] Appl. No.: 612,041

[22] Filed: Sept. 10, 1975

Related U.S. Application Data

[63] Continuation-in-part of Ser. No. 412,359, Nov. 2, 1973, abandoned, which is a continuation-in-part of Ser. No. 156,088, June 23, 1971, abandoned.

[51] Int. Cl.$^2$ ............................................. C01B 33/12
[52] U.S. Cl. ...................................... 423/338; 423/339
[58] Field of Search .................... 423/335, 338, 339; 106/288 B

[56] References Cited

U.S. PATENT DOCUMENTS

| 2,856,268 | 10/1958 | Young | 423/337 |
|---|---|---|---|
| 3,165,379 | 1/1965 | Schwartz | 423/338 |
| 3,208,823 | 9/1965 | Baker et al. | 252/28 X |
| 3,367,742 | 2/1968 | Marotta et al. | 423/338 |
| 3,787,561 | 1/1974 | Acker et al. | 423/339 |
| 3,798,174 | 3/1974 | Acker et al. | 423/339 X |
| 3,862,104 | 1/1975 | Witt | 423/338 |

*Primary Examiner*—Jack Cooper
*Attorney, Agent, or Firm*—Kenneth E. Prince

[57] ABSTRACT

A loosely aggregated 200–500 millimicron primary particle size silica can be produced by a silicate neutralization technique. The process consists of neutralizing an alkali metal silicate solution by addition to an ammoniated acetic acid or carbonic acid mixture. These particles are loosely aggregated to an average particle size of about 1 micron. These particles are readily deaggregated in a fluid energy mill. A very convenient technique is to dry and deaggregate in a fluid energy mill in a single step.

6 Claims, 2 Drawing Figures

4,049,781

METHOD OF PREPARING LOOSELY AGGREGATED 200-500 MILLIMICRON SILICA

This is a continuation-in-part of U.S. Application Ser. No. 412,359, filed Nov. 2, 1973, which in turn is a continuation-in-part application of U.S. Application Ser. No. 156,088, filed June 23, 1971, both now abandoned.

This invention relates to a method of producing loosely aggregated silica articles of an average particle size of about 1 micron wherein the primary particle size is in the range of 200–500 millimicrons. Further, this invention relates to fluid energy milling these silica aggregates to produce some individual 200–500 millimicron sized silica particles.

Silica materials, and particularly ultrafine silica materials in the sub-micron particle size range, have been found very useful. Particularly effective uses for the 200–500 millimicron sized silica materials of this invention are as pigments and delustering agents. As delustering agents, these silica products are incorporated into nylon threads. The advantage of silica over commonly used titania is that silica is essentially chemically inert, while titania is a catalyst for the photodegradation of nylon. As a pigment, the silica products of this invention are useful as carriers for organic dyes, and as carriers for precipitated inorganic oxide pigments. Such dyes and pigments can be incorporated into many known materials such as inks, paints, resins and so on.

Thus far, the prior art has not disclosed methods of forming loosely aggregated highly porous silicas having an average primary particle size in the 200–500 millimicron range, followed by the deaggregation of these silica materials to their individual 200–500 millimicron primary particles. These 200 to 500 millimicron primary particles are micellular particles and have a generally spherical shape. The larger agglomerates of these spherical shaped primary particles are of varied shapes. It is this comparatively large primary particle size which is unique to this invention. Further, and more importantly, it is the production of such materials by a silicate neutralization technique which is exceptionally unique.

A process which has some similarities to one embodiment of producing the present silica is set out in U.S. Pat. No. 3,165,379. However in this patent there is being produced a silica aerogel. Silica aerogels are lightweight porous materials which have a primary particle size in the range of 2 to 20 millimicrons. Their low bulk densities and high porosities make them good thickening agents for various organic media. The present processes differ from the process of this patent in several ways. In regard to one embodiment it is required that the gelling agent have a pH of 10 to 11. It is further required that the alkali metal silicate be added to the gelling agent. In U.S. Pat. No. 3,165,379 the gelling agent has a pH of from slightly acid up to about 8.5-9 when ammonium carbonate is used. Further in this patent a mixing nozzle is used which precludes the creation of high silicate dilution by the addition of the alkali metal silicate to the gelling solution. The use of the high pH gelling solution and high dilution permits the silica primary particles to grow to the 200 to 500 millimicron size before these coalesce to a loose aggregate.

The second embodiment of this invention is very different from U.S. Pat. No. 3,165,379. In this embodiment an ammoniated alkali metal silicate solution is added to an alcoholic gelling agent solution. This is very different from the processes of this patent.

It is therefore an object of this invention to produce loosely aggregated silica products having an average particle size of about 1 micron or larger, and which when deaggregated are in the average primary or micellular particle size range of about 200–500 millimicrons.

It is further a prime object of this invention to produce these loosely aggregated silicas by an alkali metal silicate neutralization technique wherein the alkali metal silicate is added to specific gelling agents which have a pH of 10 to 11.

It is also a feature of this invention of providing a method of concurrently drying and deaggregating these aggregated silicas so as to efficiently produce very useful 200–500 millimicron, essentially spherical, silica materials.

Figure 1:
FIG. 1 is an electron photomicrograph of a silica having a primary particle size in the range of 200 to 500 millimicrons produced by a process of this invention.

In brief summary, this invention comprises either neutralizing an alkali metal silicate solution by addition to an ammoniated ammonium carbonate, formic acid, acetic acid or propionic acid solution, or neutralizing an ammoniated alkali metal silicate solution by addition to an alcoholic, formic, acetic or propionic acid solution to produce loosely aggregated particles of silica. These loosely aggregated particles have an average primary particle size of about 200 to 500 millimicrons. These aggregated particles are then either dried and subsequently deaggregated by fluid energy milling, or concurrently dried and deaggregated by feeding an undried slurry of the aggregated silica to a fluid energy mill. After deaggregation, the produce consists essentially of the 200 to 500 millimicron average essentially spherical shaped particles. That is, the silica is essentially in its primary particle size range.

It is believed that features of this process most responsible for the large average primary particle size are the formation of the silica using a gelling agent having a pH of 10 to 11 and the addition of the alkali metal silicate to the gelling agent. The use of such a high pH gelling agent causes a rapid insolubilization of the surface silica molecules to form spheres of about 200–500 millimicrons, and the addition of the alkali metal silicate solution to the gelling agent solution provides a high dilution of the alkali metal silicate in the combined solutions. This high dilution factor allows the large silica particles to form before they coalesce into aggregates. After particle formation the interior silica molecules gel under the influence of the gelling agent which migrates into these particles. A high pH and the addition of the alkali metal silicate to the gelling agent are essential features of the process. This is the case also when the ammoniated alkali metal silicate solution is added to an alcoholic gelling agent since there will be a high local pH causing rapid silica insolubilization. The alcohol, as well as the water present, provides the dilution factor.

In more detail, this invention comprises two differing techniques for producing these unique silica materials. Each technique as a first step forms an alkali metal silicate solution containing about 4 to 20 percent by weight of $SiO_2$. This is an aqueous solution of the alkali metal silicate, usually a sodium silicate. Sodium silicate is the preferred alkali metal silicate since it is least expensive and most readily available.

The techniques differ in the second and subsequent steps of the process. The first technique consists of forming an ammoniated formic, acetic, propionic or carbonic acid solution. These ammoniated solutions contain what is termed an excess of ammonia. By excess of ammonia is meant an amount in excess of a stoichiometric amount relative to the formic, acetic, propionic or carbonic acid component in order to form ammonium formate, ammonium acetate, ammonium propionate or ammonium carbonate. Therefore there will be ammonia present in the hydrated form, that is, ammonium hydroxide. The pH of this ammoniated acid solution is in the range of 10 to 11. The alkali metal silicate solution is then added to this ammoniated formic, acetic, propionic or carbonic acid solution, preferably with stirring, to form the loosely aggregated silica particles having a primary particle size in the 200–500 millimicron range. The size of the primary particles is set at this point in the process. The slurry may then be washed, deaggregated and dried. Any conventional silica washing technique can be used. A particular embodiment is to feed a washed, or washed and dried, slurry to a fluid energy mill such as a Micronizer for deagglomerating the silica particles to essentially their primary particle size. The result in any instance is a dry 200 to 500 millimicron primary particle size silica.

In the second techique, after the step of forming the alkali metal silicate solution, this alkali metal silicate solution is ammoniated to a pH of about 10 to 11.5 by the addition of ammonia or ammonium hydroxide. This ammoniated alkali silicate solution is then added to an alcoholic solution of formic, acetic or propionic acid to form a silica slurry. There is sufficient acid used so as to completely react with the alkali ions in the sodium silicate solution. The alcohols used to form the alcoholic solution may be of the lower aliphatic alcohols which are liquid and miscible with water at ambient temperatures. Very useful alcohols are ethanols, propanols, butanols, pentanols and hexanols. The amount of alcohol used is from about 5 to 50 times the volume of acid. After formation of the silica, it may be washed, deaggregated and dried. A particular embodiment here also is to feed a washed, or washed and dried, slurry to a fluid energy mill for deagglomerating the silica to essentially its primary particle size. The result in any instance is a dry 200 to 500 millimicron primary particle size silica.

The washing technique used in either of the above techniques preferably consists of an acid wash to remove any residual sodium ion content. This is conveniently carried out by using an acidic formic, acetic, propionic, sulfuric or similar acid solution at a pH of about 2.5 to 4. This may be followed by a neutral or alkaline wash. Drying may be by oven drying, rotary calcining or by a concurrent drying and deaggregating in a fluid energy mill such as a Micronizer. When used for this concurrent operation, the mill is operated using a fluid at a pressure of 25 to 225 psi and temperatures of about 25° C to 350° C.

FIG. 1 is an electron photomicrograph of a typical silica produced according to the above processes. The photomicrograph is at 40,000 magnification. The spherical primary particles are in the average size range of 200 to 500 millimicrons.

The following examples are set out to further amplify the present invention.

EXAMPLE 1

A sodium silicate solution was formed consisting of 28 percent $SiO_2$, 7.8 percent $Na_2O$, with the remainder being water. An additional 125 ml. of water is then added to 175 g. of this sodium silicate solution. An ammoniated acetic acid solution was formed by admixing 30 g. of acetic acid, 110 g. of 30 percent $NH_4OH$ and 125 g. of water. The sodium silicate solution was added to the ammoniated acetic acid solution with stirring. The formed silica slurry was then filtered and washed with a pH 3 acetic acid solution to a residual sodium ion content calculated as $Na_2O$ of 0.13 percent. This silica was oven dried at 200° C. This silica has a surface area of 336 m²/g. pore volume of 1.36 cc/g and an average loosely aggregated particle size of 0.5–1 micron. The primary particle size was determined by electronmicrographs to primarily range between 200–400 millimicrons.

EXAMPLE 2

A sodium silicate solution was formed consisting of 28 percent $SiO_2$, 7.8 percent $Na_2O$, with the remainder being water. An additional 125 ml. of water is then added to 175 g. of this sodium silicate solution. An ammoniated acetic acid solution was formed by admixing 30 g. of acetic acid, 110 g. of 30 percent $NH_4OH$ and 125 g. of water. This sodium silicate solution was added to the ammoniated acetic acid solution with stirring. The formed silica slurry was then filtered and washed with a pH 3 acetic acid solution to a residual sodium ion content calculated as $Na_2O$ of 0.093 percent. This silica was oven dried at 200° C. This silica has a surface area of 271 m²/g pore volume of 1.25 cc/g and an average loosely aggregated particle size of 0.5–1 micron. The primary particle size was determined by electronmicrographs to primarily range between 200 to 400 millimicrons.

EXAMPLE 3

The silica product of Example 1 was fed to an 8 inch Micronizer. The product was a deagglomerated silica of particles in the size range of 200 to 500 millimicrons.

EXAMPLE 4

An ammoniated sodium silicate solution was prepared by admixing 175 g. of sodium silicate, 500 g. of water and 110 g. of 30 percent $NH_4OH$. an alcoholic acetic acid solution was formed by admixing 30 g. of acetic acid and 500 ml. of n-butyl alcohol. The ammoniated sodium silicate solution was added to the alcoholic acetic acid solution with stirring. The resulting silica slurry was homogenized in a Waring Blender, filtered and washed on the filter with a pH 3 aqueous acetic acid solution. This washed silica is then oven dried at 200° C. This silica product has a surface area of 425 m²/g, pore volume of 1.8 cc/g, average aggregate particle size of 1 micron, and a primary particle size of 200 to 400 millimicrons.

EXAMPLE 5

139.5 g. of a sodium silicate solution 28 percent $SiO_2$, 7.8 percent $Na_2O$ was diluted with 200 ml. of water. An ammoniated ammonium carbonate solution was formed by admixing 60 g. of $(NH_4)_2CO_3$, 44.4 g. of $NH_3$ and 200 ml. of water. The pH of this solution is 9.9. The sodium silicate solution was added to the ammoniated carbonic acid solution. A silica slurry forms. 100 ml. of a 21 percent sulfuric acid solution is added to remove any residual sodium ions. This slurry is filtered, and washed with a pH 3 acetic acid solution. This silica is dried at 100° C and fed to a 4 inch fluid energy mill (Micronizer). The deaggregated silica has a surface area of 456 m²/g, pore volume of 1.3 cc/g. and a primary particle size of 200 to 500 millimicrons.

EXAMPLE 6

This is a comparison example of a silica produced using a gelling agent having a pH of about 9 and wherein the gelling agent solution is added to the sodium silicate solution. The resulting product is a low density siliceous aerogel.

Prepare a first solution consisting of 333 ml. of a 25 percent ammonium carbonate solution. This solution has a pH of about 9.1. Prepare a second solution consisting of 666 ml. of a sodium silicate solution containing 15 percent $SiO_2$. This solution has a pH of about 11.8. Add 115 ml. of the ammonium carbonate solution to the stirred sodium silicate solution, thereby decreasing the sodium silicate pH to 11.1, at which point a silica hydrogel forms. The remainder of the ammonium carbonate solution is added with stirring, yielding a final pH of 10.0. The 10.0 pH silica hydrogel was added to a solution of 132 g. ammonium sulfate in 1300 ml. of water with stirring to base exchange the sodium ions from the silica hydrogel. The silica hydrogel was maintained in the ammonium sulfate solution for 15 minutes. Place half of the silica hydrogel on a suction filter and wash with 9 liters of 60° C water. Oven dry the washed silica at 200° C.

Figure 2:
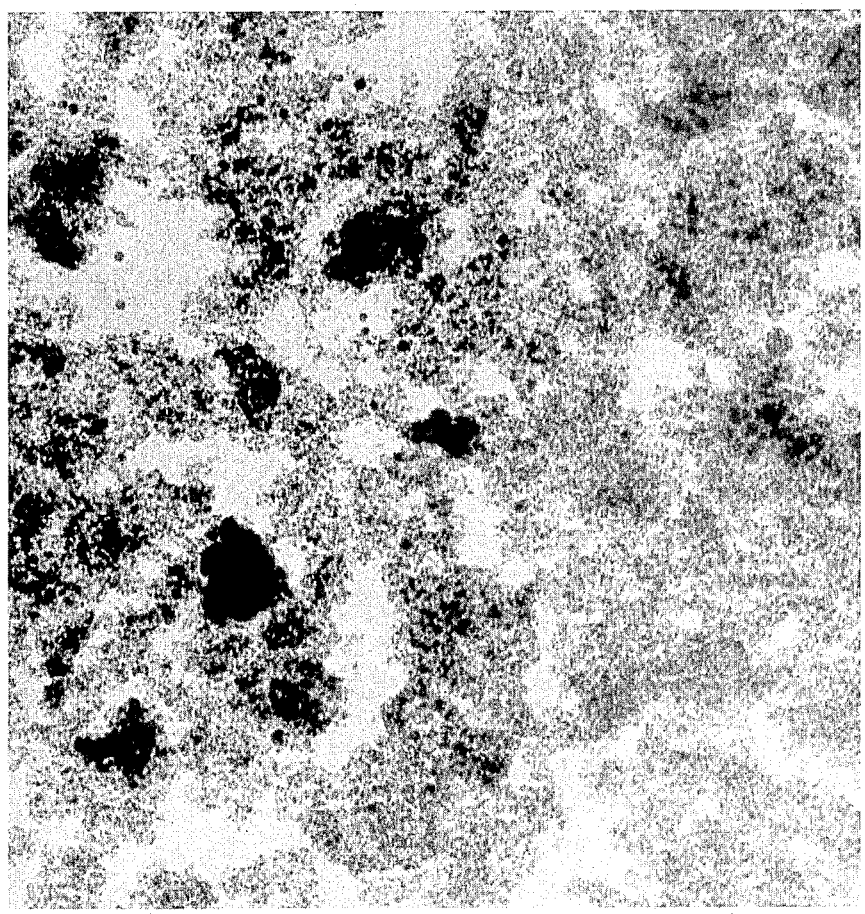
FIG. 2 is an electron photomicrograph of the silica produced following Example 6.

FIG. 2 is an electron photomicrograph at 100,000 magnification of the silica produced according to this example. The primary particle size of this silica is less than 50 millimicrons and is primarily in the range of 15 to 30 millimicrons. This is a typical primary particle size range for a silica aerogel. This difference in primary particle size from that produced following Examples 1-5 is considered to be the result of using the lower pH gelling agent and of adding the gelling agent solution to the sodium silicate solution. The gelling agent in Examples 1-5 has a pH of 10 to 11 and the sodium silicate reacts with the gelling agent so that it is in a high dilution with respect to the gelling agent. Both of these modes of operation are considered to be necessary to produce a 200 to 500 millimicron primary particle size silica.

What is claimed is:

1. A method of producing loosely aggregated silica having an average primary particle size in the range of 200 to 500 millimicrons comprising adding an alkali metal silicate solution to an ammoniated gelling solution selected from the group consisting of an ammoniated formic acid solution, an ammoniated acetic acid solution, an ammoniated propionic acid solution and an ammoniated carbonic acid solution, said ammoniated gelling solution containing a substantial excess of ammonia and having a pH of 10 to 11, to form a slurry of said loosely aggregated silica and recovering said loosely aggregated silica.

2. A method as in claim 1 wherein said loosely aggregated silica is washed with an acidic solution and dried.

3. A method as in claim 1 wherein said loosely aggregated silica is deaggregated by passage through a fluid energy mill operated at 25° C to 350° C and 25 to 225 psi pressure.

4. A method as in claim 1 wherein said ammoniated solution is an ammoniated acetic acid solution.

5. A method as in claim 1 wherein said ammoniated solution is an ammoniated carbonic acid solution.

6. The method of claim 1 wherein said alkali metal silicate solution contains about 4 to 20 percent by weight $SiO_2$.

* * * * *